United States Patent [19]

Berger et al.

[11] 4,318,968
[45] Mar. 9, 1982

[54] BATTERIES, ACCUMULATORS AND ELECTROCHEMICAL GENERATORS WITH NON-METALLIC ELECTRODES OR ELECTRODES IN SOLUTION

[75] Inventors: Michel Berger, St. Lambert Des Bois; Jacques Lys, Versailles; Georges Demaire, Bonnelles, all of France

[73] Assignee: Societe e'Etudes et de Recherches en Sources d'Energie Nouvelles, Bonnelles, France

[21] Appl. No.: 197,348

[22] PCT Filed: Jul. 11, 1979

[86] PCT No.: PCT/FR79/00062
§ 371 Date: Mar. 11, 1980
§ 102(e) Date: Mar. 11, 1980

[87] PCT Pub. No.: WO80/00284
PCT Pub. Date: Feb. 21, 1980

[30] Foreign Application Priority Data

Jul. 11, 1978 [FR] France .................................. 78 20637

[51] Int. Cl.³ .............................................. H01M 4/36
[52] U.S. Cl. ...................................... 429/105; 429/206
[58] Field of Search ............................... 429/105–109, 429/119, 199, 218, 219, 223, 206, 207

[56] References Cited

U.S. PATENT DOCUMENTS

| | | | |
|---|---|---|---|
| 3,174,880 | 3/1965 | Buitkus | 429/105 X |
| 3,481,790 | 12/1969 | Duddy | 429/119 |
| 4,192,910 | 3/1980 | Frosch | 429/107 X |
| 4,198,474 | 4/1980 | Shah | 429/119 X |

Primary Examiner—Charles F. LeFevour
Attorney, Agent, or Firm—Oblon, Fisher, Spivak, McClelland & Maier

[57] ABSTRACT

Batteries, accumulators or electrochemical generators of electric energy, the negative electrode (anode) of which consists of at least one alkaline halide, in aqueous or alkaline solution, or of one metallic halide, and one auxiliary electrode collecting current.

The positive electrode (cathode) consists of at least one metallic hydroxide or oxide which can be in solution in the electrolyte and which, preactivated or regenerated continuously by the presence of air or oxygen introduced into the alkaline solution bathing the cathode, supplies the hydroxyl ions necessary for the oxidation of the halide constituting the anode. Furthermore, some compounds of the anode, according to the invention, can be thermally or photonically regenerated.

Various applications of these devices, in particular sea water, can be implemented for the supply of electric energy, using easily available and cheap fuel.

18 Claims, 1 Drawing Figure

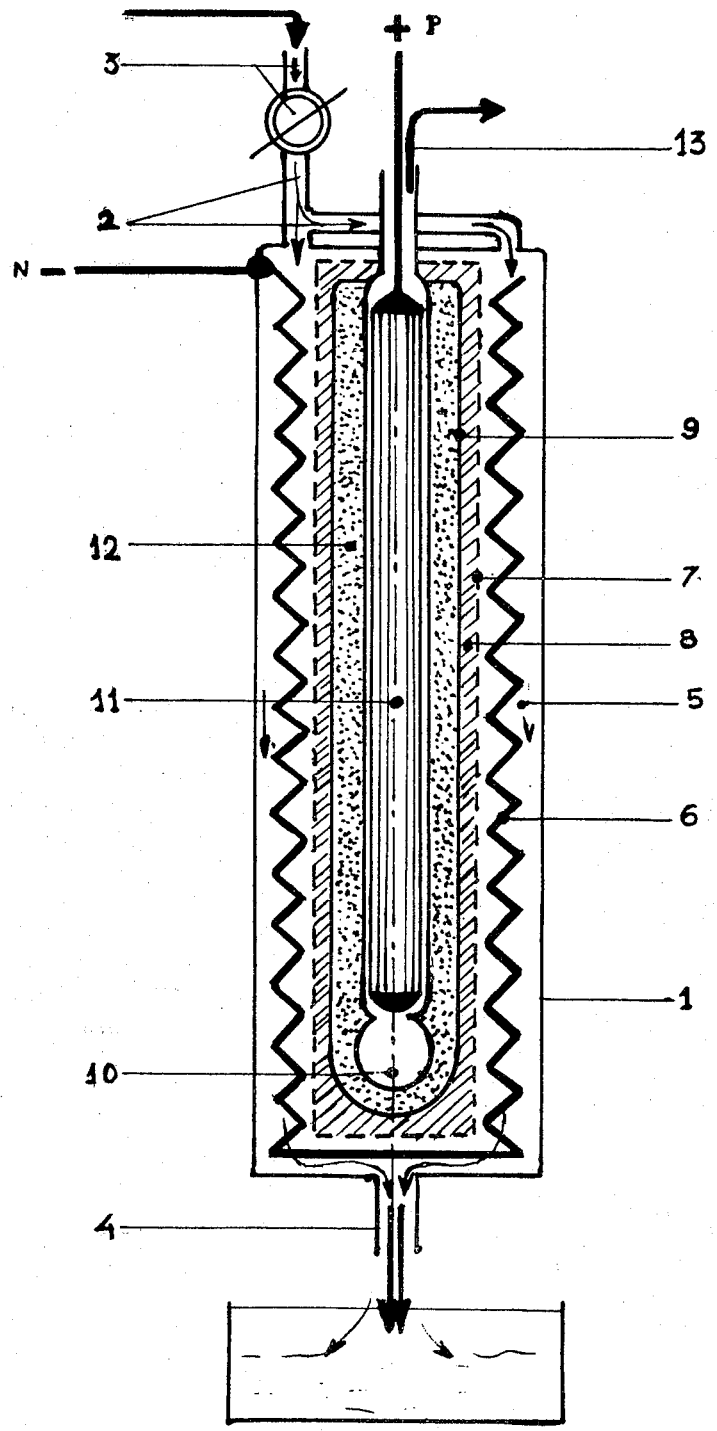

BATTERIES, ACCUMULATORS AND ELECTROCHEMICAL GENERATORS WITH NON-METALLIC ELECTRODES OR ELECTRODES IN SOLUTION

The present invention relates to batteries, to electric accumulator cells and to electrochemical generators supplying electric energy by cold combustion of an element or an oxidizable compound.

Units of these types, including "fuel cells", make use of electrodes where the voltage and electric current developed by electrochemical reactions of oxidation are supplied. At the anode of these batteries, accumulators or generators, there takes place the oxidation of metals such as lead, cadmium, zinc, iron, lithium, etc. or of fuels such as hydrogen or other hydrogenated or hydrocarbonic compounds such as hydrazine, methanol, other alcohols or hydrocarbons, etc.

Such equipment has various disadvantages. In fact, the metals or fuels used, varying in cost from one compound to the other, can necessitate a high expenditure of energy for their preparatory chemical synthesis, isolation, extraction or refining. Furthermore, the electrochemical reaction of combustion in a conventional fuel cell does not generally take place under favourable conditions except by means of an oxidation catalyst, often of rare or costly type such as platinum sponge. Furthermore, in the category or accumulators, the number of charging and discharging cycles applicable to the cells is in general limited, because the electrolytic regeneration of the electrodes, effected at each recharging operation, cannot be effected uniformly, which is disadvantageous for the durability of the cell. Finally the regeneration of the accumulator or generator can only be carrier out by the electrical recharging of the corresponding elements or by replacement of the changed compounds or substances.

BRIEF DESCRIPTION OF THE DRAWINGS

The FIGURE is an embodiment of the electrochemical device of the present invention.

The purpose of the present invention is the making of a battery, an accumulator or an electrochemical generator using neither a metal nor a metallic compound nor a hydrocarbon nor a hydrocarbonic compound, but using a salt which exists in most cases in the natural state in unlimited quantities or which can be produced or isolated chemically without high expenditure of energy, the corresponding oxidation reaction furthermore being capable of realisation without the addition of a catalyst and the electric recharging being carried out electrically, chemically, photonically or thermally. These devices according to the invention are based on the following principles:

At the anode, the compounds used as "fuels" are the chlorides and more generally the halides, of alkaline metals such as sodium, potassium or lithium or of metals such as titanium, iron, lead, etc. In another version, ammonium halides can also be used in so far as they are similar in their structures and chemical properties to the corresponding potassium salts.

All these salts can be used in concentrations varying as a function of their specific solubility and electrical conductivity in aqueous or alkaline solution, or possibly in pure state.

Sea salt and rock salt can constitute one of the variations of anodic compound useable in the generator according to the invention, in so far as they consist mainly of sodium and potassium chlorides. The weak electrical conductivity of sea water makes necessary however, as will be seen below, special provisions with respect to the anode of the generator where it is used directly.

The invention relates to batteries, accumulators and electric generators or fuel cells, as follows.

In the category of batteries or accumulators, the cell consists of:

a cathode (positive electrode) consisting of a metallic oxide, such as titanium dioxide, cobalt oxide, silver oxide, etc. hydroxided and either placed in solution in the electrolyte which under these conditions must constitute a bath for the cathode excluding other constituents of the cell, or deposited on an expanded, laminated or sintered metal support such as nickel.

an anode (negative electrode) consisting of a chloride or more generally a halide of sodium, lithium, calcium, potassium, etc. or of a non-alkaline metal such as titanium, lead, iron, etc. This chloride or, more generally this halide is either placed in solution in the electrolyte with a concentration approaching saturation, or is impregnated on a metal support which is a good conductor and spongy, such as nickel or titanium, expanded, laminated or sintered or moulded under high pressure on a conductive metal support which acts as current collector.

an electrolyte which is, as the case may be, an aqueous or alkaline solution, or a highly alkaline animal or mineral gel, the latter being obtained by the addition of sodium hydroxide or potassium hydroxide or ammonium chloride, supplemented by various additives such as the oxide or hydroxide of lithium, providing an improved ion exchange and acting as depolarizer. In the case in which the halide is not dissolved in the liquid or gelled electrolyte, the latter is placed and used in the anodic compartment in such a way that there is as close an adherence as possible between the separator and the electrolyte on the one hand, and on the other hand between the electrolyte and the active materials constituting the anode.

a separator which acts as an ion exchange diaphragm which consists of crude kaolin porcelain with a thickness as low as possible, or of a cellulose compound, or a synthetic compound of nylon or polypropylene fibres, or a carbonated compound, rendered non-conductive, these compounds possibly being supplemented by a cellophane diaphragm which is permeable to ions.

In the category of generators, the positive electrode (cathode) consists of one or more metallic hydroxides, obtained e.g. from titanium dioxide and/or cobalt oxide and/or silver oxide, etc. These metallic hydroxides can, in a first version, be deposited on a metal support which is a good conductor, expanded, laminated or sintered, or, in a second version, be dissolved in the alkaline solution, e.g. of soda or potash, bathing the cathode and not the other components of the generator. In all cases, the cathode is designed to ensure a continuous very close interaction between the air or the oxygen used as oxidant in the electrochemical oxidation reaction, and the metallic hydroxide (s) mentioned above. Thus, in the first version, the air or the oxygen is introduced and brought into contact with the materials of the cathodes via microperforations provided over the whole outside surface of the cathodic armature e.g. by electric discharge. In the second version, according to which the metallic hydroxides are dissolved in the alkaline solution, the air or the oxygen are introduced into the bath by orifices located at the bottom of the vessel and ensuring a continuous emulsion of the gases in the solution to produce the reoxidation of the active materials of the cathode; in this second version the current is collected by a conductive auxiliary metal electrode consisting e.g. of expanded, laminated or sintered nickel, and with a surface of exchange with the cathodic solution as large as possible. The alkaline solution of soda or potash, mentioned above, which acts as electrolyte in the generator, can be supplemented by various additives such as lithium oxide, providing an improved ion exchange.

The negative electrode (anode) consists of an alkaline or metallic halide, e.g. a chloride such as sodium chloride, potassium chloride, titanium tetrachloride, dissolved in the case of an alkaline halide in an alkaline hydroxide or in water. The salt, in normal solution or concentrated in sea water, naturally constitutes an application of this type of electrode, in a version corresponding to the use of an aqueous solution. This application necessitates, as already mentioned above, the use of an auxiliary metal electrode for the purpose of collecting the current circulating at anode level. This collector electrode consists of an expanded, sintered or laminated metal, offering the largest possible exchange surface with the saline solution in which it is immersed.

The separator, which acts as ion exchange diaphragm between the positive electrode and the negative electrode of the generator, consists either of china clay, or of a cellulose compound or of a synthetic material on a nylon fibre or polyproylene base or of a carbonic compound rendered non-conductive, all of these possibly being supplemented by a cellophane diaphragm.

The main electrochemical reactions, characterizing the operation of the battery, accumulator, or electrochemical generator as described above, in the case in which, for example, the negative electrode consists of sodium chloride, can be summarized by the following expression with the standard symbols used, and according to which in particular $e^-$ represents the electrical charge of an electron and $OH^-$ the hydroxyl ion of the negative electric charge.

At the cathode, where, for example, the titanium dioxide constitutes the basic active material:

$$Ti(OH)_3OOH + HOH + 2e^- \rightarrow (TiO_2, 2H_2O) + 2OH^-$$

On contact with the air or the oxygen introduced into the cathode, the titanium hydroxide $(TiO_2, 2H_2O)$ is regenerated as follows:

$$TiO_2, 2H_2O + \tfrac{1}{2}O^2 \rightarrow Ti(OH)_3OOH$$

in such a way that the overall reaction at the cathode, resulting from the combination of the above two expressions, can be written:

$$HOH + \tfrac{1}{2}O^2 + 2e^- \rightarrow 2OH^-$$

At the anode, the electrochemical reaction of oxidation of sodium chloride take the following form:

$$ClNa + 8OH^- \rightarrow ClO^4Na + 4H_2O + 8e^-$$

If the anodic solution is, in a different version, made up of potassium iodide in solution in water or in potash, the corresponding reaction can be written:

$$IK, 8OH^- \rightarrow IO_4K + 4H_2O + 8e^-$$

In a further version, if the anodic solution consists of titanium tetrachloride, the reaction will be written as follows:

$$Cl_4Ti + 32OH^- \rightarrow (ClO_4)_4Ti + 16HOH + 32e^-$$

These various expressions show that in fact the electrolytic oxidation of the salt constituting the anode results in the formation of a perchlorate or more generally a perhalogenate with the supply of electrical energy. Thus, one gram-molecule of sodium chloride is changed into one gram-molecule of sodium perchlorate by the addition of 2 gram-molecules of oxygen and can, in theory, liberate the energy of 8 gram-electrons on the external electric circuit, i.e. approximately 772,000 coulombs. In this extreme hypothesis, one liter of sea water, titrating about 30 g salt per liter, i.e. approximately 0.5 gram-molecules of sodium chloride, can therefore in theory produce an energy of around 390,000 coulombs.

The electric voltage measured at the terminals of such a generator being 1.65 volts unloaded and 1.5 volts under load, it might be concluded that such a device can develop an energy per unit of mass of at least 165 watts/hour per liter of sea water consumed.

In reality, an application of this type of device made for experiment has resulted in an energy per unit of mass developed on the load circuit of 5 watts/per hour of sea water consumed, under the above mentioned voltage of 1.5 v under load. The sodium perchlorate formed in the generator, under the terms of the electrochemical reactions expressed above, being soluble in water at the critical theoretical concentration of about 0.5 gram-molecule per liter, was demonstrated in the anodic solution by the use of a characteristic reagent.

It will be noted furthermore that about 22.4 l oxygen under atmospheric pressure, i.e. slightly more than 100 liters of air, are theoretically necessary to ensure the total oxidation of the salt contained in one liter of sea water. The continuous supplying of air (of cathode) and sea water (of anode) thus ensures the continuous operation of this type of generator.

At generator output, the salt initially contained in the water or in the alkaline solution is, in theory, completely oxidized.

In practice, in order to ensure the complete transformation of the halide constituting the anode, it may be necessary to recycle the solution several times through the same generator, or to pass the saline solution through several units in succession, until it is practically totally exhausted of its energy and there is a sufficiently low residual halide concentration.

It will be noted also that the perchlorate, or more generally the perhalogenate, obtained when all or part of the chloride or halide is oxidized, can if necessary be generated by passing it through the generator again, the polarities being reversed as when a conventional accumulator is recharged. This method of regeneration is of course only possible when all precautions are taken to avoid concomitant electrolysis phenomena; in particular regeneration is carried out preferably on perhalogenates in high concentrations.

The annexed drawing illustrates, by way of example, in embodiment of the device in accordance with the present invention, in the version corresponding to the electrochemical generator. As is shown in longitudinal section, this device has an external plastic cylindrical tank 1, to which are connected pipes 2 for admission of the anodic liquid, consisting, e.g., of a sodium or potassium chloride in alkaline or aqueous solution. A valve 3 controls the intake flow of the anodic liquid into the tank. A pipe 4 is located in the bottom of the tank and permits drainage of the exhausted anodic liquid towards an external auxiliary recovery tank. The anodic liquid 5 bathes the auxiliary electrode 6 consisting of expanded or fritted nickel, arranged concentrically to the internal periphery of the plastic tank and connected to the negative electric terminal N of the generator. An armature 7 ensures the mechanical characteristics of the separator. The latter consists of a layer of polypropylene fibre 8, applied to the armature 7, and a cellophane film 9 which is insulating but electrically permeable to ions. The oxygen or air for continuous regeneration of the cathode is introduced at 10, in the lower part of the generator, via a suitable pipe mounted longitudinally in the cathodic compartment. The cathode 11 consists of a fritted nickel plate which is wound round itself, saturated with hydroxided cobalt oxide and titanium oxide, and bathing in the alkaline solution 12 acting as electrolyte. The cathode 11 is electrically connected to the positive terminal P of the generator.

In a different version, solution 12 can consist of both the alkaline electrolyte and of metallic hydroxide in solution or in suspension consituting the active materials of the cathode, the grid of nickel 11 then acting as auxilliary electrode for collection and passage of electric current.

In all cases, the air or oxygen introduced at 10 in excess and under a slight overpressure in relation to atmospheric pressure, circulates longitudinally along the cathode and escapes at 13 via an orifice located in the top part of the generator. For low-power devices, orifices 10 and 13 for air intake and exhaust can be eliminated, the atmospheric pressure being adequate to ensure the continuous presence of oxygen dissolved in the solution bathing the cathode.

In another version of the generator according to the invention, the anodic and cathodic compartments are inversed in relation to the device shown in the annexed figure. In this case, no air or oxygen intake pipe is provided in the cathodic compartment; on the other hand the external armature 1 of the generator is microperforated over its entire surface in order to allow free passage to the air towards the outside of the cathodic compartment without however permitting the passage and flowing out of the electrolyte or of the solution bathing the cathode, towards the outside.

The metallic or alkaline halides used as anodes for the generators according to the invention are oxydized in perhalogenate state (perflurates, perchlorates, perbromates or periodates) at the end of the electrochemical reactions, the principles of which have been set out above, most of them being chemically stable at the ambient temperature but which can be reduced, with liberation of oxygen, into compounds characterized by lesser degrees of oxidation. This operation can be carried out e.g. by using a deoxydation catalyst, such as manganese bioxide, by heating the mixture. The decomposition temperature varies according to the compound obtained and can be at relatively low levels in particular for the periodates and the perbromates.

The anodic solution used, coming from the generator after delivery of electric energy, can in these particular cases, thus be easily regenerated by heating or heat or photonic radiation of appropriate kind. This solution can prove advantageous if metallic or alkaline halides are used which are relatively costly or which result in perhalogenates which are difficult to store or eliminate. Furthermore it can in this way provide energy conversion of thermoelectric or photoelectric type, which furthermore opens up another field of application to the above mentioned types of accumulators and generators.

Whatever the forms and dimensions adopted, the characteristics of the batteries, accumulators and generators object of the present invention, can place them in the forefront of batteries and accumulators, electrical energy generators, and energy convertors. They can be used produce electric energy, to supply traction units, networks, for continuous or emergency lighting, vehicles, machines and sundry plant, and for the conversion of solar energy or heat into electricity.

The capability of one of the types of generators described to consume sea salt as "fuel" and the ambient air as an oxidant, can render valuable its use on offshore or on-shore sites for the local production of electric energy.

We claim:
1. A battery, accumulator or electrochemical generator of electric energy, comprising:
   a cathode comprising at least one metal hydroxide or oxide dissolved or suspended in an aqueous alkaline electrolyte or supported on a conductive metallic substrate in said aqueous alkaline electrolyte, said cathode being capable of being activated and regenerated by the passage of an oxygen containing gas through the active materials of said cathode; and
   an anode comprising at least one metal halide or alkaline halide salt, the halide ions of said salt being converted to an oxygenated product which is capable of being decomposed with the liberation of oxygen thereby permitting said liberated oxygen to be recycled to said cathode.

2. The device of claim 1, wherein in said cathode, said metallic hydroxide or oxide is in solution or suspension in said aqueous alkaline electrolyte.

3. The device of claim 2, wherein said aqueous alkaline electrolyte of said cathode is in the liquid state or is gelled.

4. The device of claim 1, wherein said metallic substrate of said cathode is an expanded, laminated or fritted material.

5. The device of claim 1, wherein, in said anode, said halide salt is compressed and placed on a conductive metallic support.

6. The device of claim 1, wherein, in said anode, said metal halide or alkaline halide salt is in solution or in suspension in water or an aqueous alkaline electrolyte.

7. The device of claim 6, wherein said solution or suspension is in the liquid state or gelled.

8. The device of claim 1, wherein said alkaline halide of said anode is sodium chloride or potassium chloride.

9. The device of claim 6, wherein said anode consists of sea salt or rock salt in a water solution.

10. The device of claim 1, wherein said aqueous alkaline electrolyte of said cathode comprises sea salt or rock salt in water solution.

11. The device of claim 1, wherein said halide salt of said anode is a basic metal chloride, bromide, iodide, fluoride or mixtures thereof.

12. The device of claim 1, wherein said halide salt anode is a metal halide.

13. The device of claim 12, wherein the halide salt of said anode is an iron halide, a lead halide, a titanium halide, a zinc halide or mixtures thereof.

14. The device of claim 1, 9, 11, 12 or 13, wherein the oxygenated product of said anode is at least one halogenate or perhalogenate decomposable by light or heat.

15. The device of claim 1, 9, 10, 11, 12 or 13, wherein said cathode consists of at least one hydroxide or oxide of titanium, cobalt, nickel or silver.

16. The device of claim 1, wherein the oxygen introduced into said cathode is the oxygen which is liberated from said product of electrolysis in said anode.

17. A battery, accumulator or electrochemical generator of electric energy, comprising:
- a cathode comprising at least one metal hydroxide or oxide in solution or in suspension in an aqueous alkaline electrolyte, said cathode being capable of being activated and regenerated by the passage of an oxygen containing gas through the active materials of said cathode;
- an anode comprising at least one metal halide or alkaline halide salt in solution or in suspension in water or an aqueous alkaline electrolyte, the halide ions of said salt being converted to an oxygenated product which is capable of being decomposed with the liberation of oxygen thereby permitting said liberated oxygen to be recycled to said cathode; and
- at least one auxiliary metallic electrode to ensure the collection and passage of electric current in said battery, accumulator or electrochemical generator.

18. A battery, accumulator or electrochemical generator of electric energy, comprising:
- a cathode comprising at least one metal hydroxide or oxide in solution or in suspension in an aqueous alkaline electrolyte, said cathode being capable of being activated and regenerated by the passage of an oxygen containing gas through the active materials of said cathode;
- an anode comprising at least one metal halide or alkaline halide salt in solution or in suspension in water or an aqueous alkaline electrolyte, the halide ions of said salt being converted to an oxygenated product which is capable of being decomposed with the liberation of oxygen thereby permitting said liberated oxygen to be recycled to said cathode; and
- at least one auxiliary metallic electrode to ensure the collection and passage of electric current in said battery, accumulator or electrochemical generator, when the active materials constituting the anode and cathode are placed in the electrolyte with the effect that the electric energy recovered is produced by the electrolytic oxidation of the halide at said anode with the formation of a halogenate or perhalogenate product.

* * * * *

UNITED STATES PATENT AND TRADEMARK OFFICE
CERTIFICATE OF CORRECTION

PATENT NO. : 4,318,968
DATED : March 9, 1982
INVENTOR(S) : MICHEL BERGER ET AL.

It is certified that error appears in the above—identified patent and that said Letters Patent is hereby corrected as shown below:

On the title page,
Please correct the Assignment as follows:

[73]--Assignee: SOCIETE D'ETUDES ET DE RECHERCHES EN SOURCES D'ENERGIE NOUVELLES --

Signed and Sealed this

Seventh Day of September 1982

|SEAL|

Attest:

Attesting Officer

GERALD J. MOSSINGHOFF

Commissioner of Patents and Trademarks